(12) United States Patent
Enderby

(10) Patent No.: US 7,853,689 B2
(45) Date of Patent: Dec. 14, 2010

(54) MULTI-STAGE DEEP PACKET INSPECTION FOR LIGHTWEIGHT DEVICES

(75) Inventor: Russell Enderby, Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 377 days.

(21) Appl. No.: 11/871,866

(22) Filed: Oct. 12, 2007

(65) Prior Publication Data

US 2008/0313738 A1 Dec. 18, 2008

Related U.S. Application Data

(60) Provisional application No. 60/929,153, filed on Jun. 15, 2007.

(51) Int. Cl.
*G06F 15/173* (2006.01)
(52) U.S. Cl. ............... 709/224; 709/203; 709/217; 709/219; 709/225; 726/22; 726/24
(58) Field of Classification Search ............... 709/224, 709/225, 238, 203, 217, 219; 726/23–25
See application file for complete search history.

(56) References Cited

U.S. PATENT DOCUMENTS

| | | | | |
|---|---|---|---|---|
| 5,960,170 A | * | 9/1999 | Chen et al. | 726/24 |
| 6,338,141 B1 | * | 1/2002 | Wells | 726/24 |
| 6,983,323 B2 | * | 1/2006 | Cantrell et al. | 709/225 |
| 7,032,114 B1 | * | 4/2006 | Moran | 726/24 |
| 7,499,412 B2 | * | 3/2009 | Matityahu et al. | 370/255 |
| 2006/0037077 A1 | * | 2/2006 | Gadde et al. | 726/23 |
| 2007/0209070 A1 | * | 9/2007 | Yadav | 726/14 |

OTHER PUBLICATIONS

"Deep Packet Inspection", Wikipedia, retrieved on Mar. 19, 2007, http://en.wikipedia.org/wiki/Deep_packet_inspection, 1 pg.

* cited by examiner

*Primary Examiner*—Ramy M Osman
(74) *Attorney, Agent, or Firm*—Sterne, Kessler, Goldstein & Fox P.L.L.C.

(57) ABSTRACT

A system and method for the multi-stage analysis of incoming packets. Three stages are used, each of which addresses a particular category of threat by examining the headers and/or payload of each packet ("deep packet inspection"). The first stage detects incoming viruses or worms. The second stage detects malicious applications. The third stage detects attempts at intrusion. These three stages operate in sequence, but in alternative embodiments of the invention, they may be applied in a different order. These three stages are followed by a fourth stage that acts as a verification stage. If any of the first three stages detects a possible attack, then the packet or packets that have been flagged are routed to a central verification facility. In an embodiment of the invention, the verification facility is a server, coupled with a database. Here, suspect packets are compared to entries in the database to more comprehensively determine whether or not the packets represent an attempt to subvert the information processing system.

22 Claims, 7 Drawing Sheets

MULTI-STAGE DEEP PACKET INSPECTION FOR LIGHTWEIGHT DEVICES

This application claims the benefit of U.S. Provisional Application 60/929,153, filed Jun. 15, 2007, which is incorporated herein by reference in its entirety.

BACKGROUND OF THE INVENTION

1. Field of the Invention

The invention described herein relates to information security, and in particular, relates to the detection of attempts to subvert an information system.

2. Background Art

Modern information systems are plagued by a variety of security problems. Many of these problems arise from the fact that a given information processing component may be connected broadly to a large universe of other components and users. The chief example, of course, is the Internet. Using the Internet, millions of users and their machines are free to interact with one another. Some of these interactions, however, may be malicious. A typical user can be victimized by a virus or worm received through communication with another machine, for example. Other malicious applications can also be sent to a user. Some such applications may, for example, cause the port through which a user typically receives telnet traffic to be changed from the usual TCP port 23. This could allow a malicious user to avoid a firewall that may otherwise be in effect at port 23. Other intrusion attempts may include the transmission of malformed packets that may be sent by hackers in an attempt to confuse applications that are not expecting incoming packets to be packaged as such.

The existing technologies for defending against such attacks tend to require significant processing and memory. One or more packets that contain a virus, for example, can be filtered out, but this requires a filter mechanism that is capable of detecting common viruses. This in turn may require a database of such viruses, or at minimum a database of information that characterizes such viruses. Using such a database, the user that may be under attack can compare an incoming packet to entries in the database. A match would signify that the incoming packet represents a virus.

For some computer systems, the amount of memory required to store such a database, and the level of processing required to execute such defensive measures, may not be a problem. But these requirements may be a problem for other systems. Some information systems have less computing power and/or less memory available to defend against such attacks. Information processing components that have relatively little processing power and/or small amounts of memory are referred to herein as lightweight devices. An example of a lightweight device is a cable modem. A cable modem (CM) can be embodied as a lightweight device, one that can be embedded in a larger component, such as a personal computer or router. While a cable modem will in fact have a processor and memory available, it does not represent a general purpose computing platform. Such an embedded device therefore has limited functionality for functions other than the basic operations required of a cable modem.

There is therefore a need for a system and method that addresses the above security concerns, but which can operate with the limited computational resources of an embedded device or other lightweight device.

BRIEF DESCRIPTION OF THE DRAWINGS/FIGURES

DETAILED DESCRIPTION OF THE INVENTION

The invention described herein is a system and method for the multi-stage analysis of incoming packets. Three stages are used, each of which addresses a particular category of threat by examining the headers and/or payload of each packet ("deep packet inspection"). The first stage detects incoming viruses or worms. The second stage detects malicious applications. The third stage detects attempts at intrusion. These three stages operate in sequence, but in alternative embodiments of the invention they may be applied in a different order.

These three stages are followed by a fourth stage that performs verification. If any of the first three stages detects a possible attack, then the packet or packets that have been flagged are routed to a central verification facility. In an embodiment of the invention, the verification facility is a server, coupled with a database. Here, suspect packets are compared to entries in the database to more comprehensively determine whether or not the packets represent an attempt to subvert the information processing system. The term "subvert" as used herein refers to the insertion of data or executable logic into an information system or the assertion of some level of control of the system, in order to gain otherwise restricted privileges or information, or to damage the system. The fourth stage can therefore confirm a subversion attempt, or alternatively show that an alert raised by an earlier stage is not valid and represents a false positive.

This arrangement relieves the embedded device (at which the packets were originally received) from the memory-intensive process of having to rigorously evaluate every incoming packet. Instead, by implementing stages one to three as described above, suspicious packets are identified, then forwarded to stage four for final verification. This minimizes the amount of processing and the amount of memory required at the embedded device.

If stage four reveals that the packet or packets represent a bonafide subversion attempt, then a notification is sent back to the embedded device. The embedded device may then take appropriate action. For example, the internet protocol (IP) source address of an offending packet may be recorded on a list so that future packets received from that source can be rejected, or "blacklisted". Alternatively, or in addition, processing of the packet stream which includes the offending packet may be halted. Finally, an alert may be sent to a central monitoring facility for further action.

Figure 1:
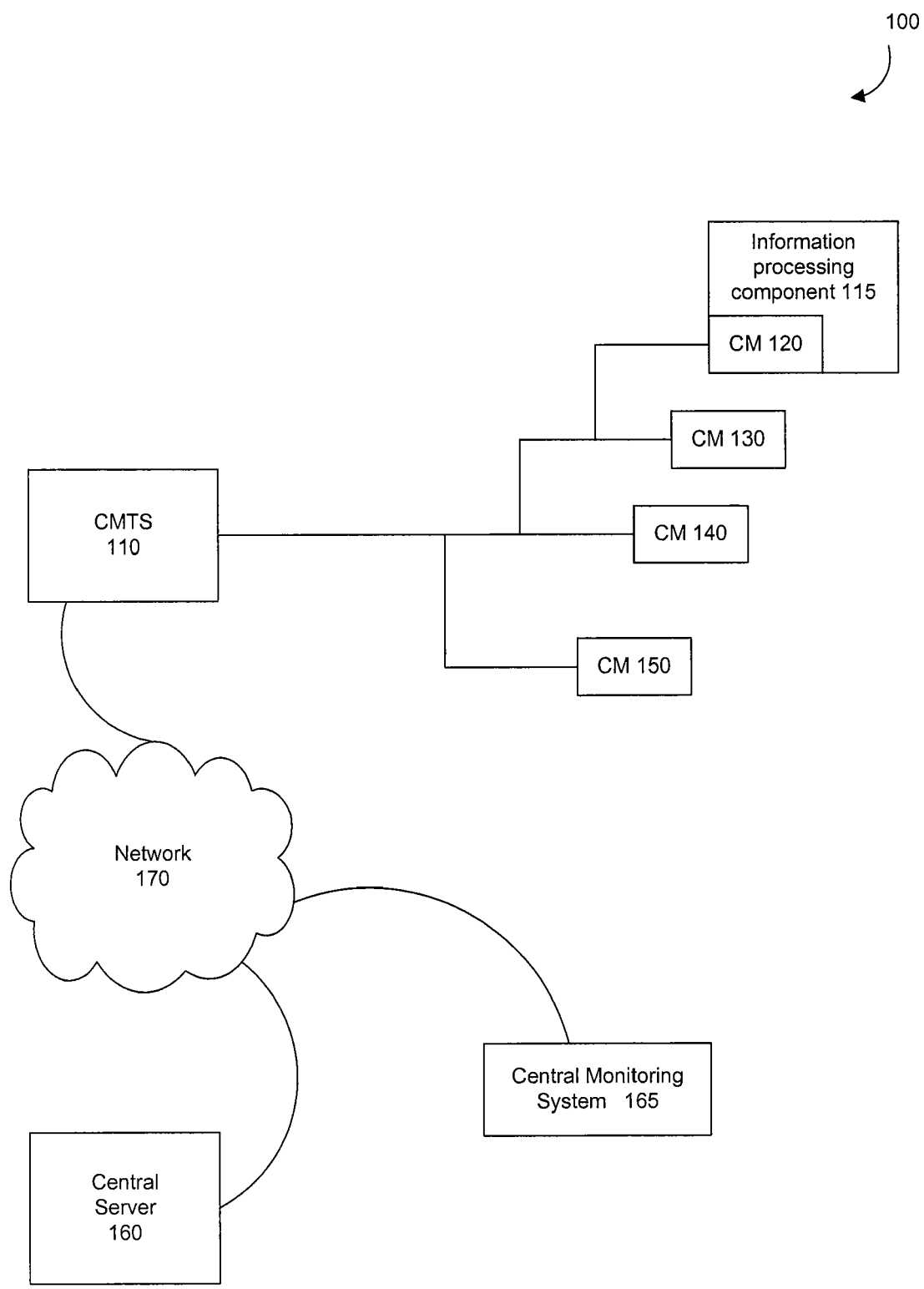
FIG. 1 is a block diagram illustrating a set of interconnected cable modems in which an embodiment of the invention described herein can be implemented.

FIG. 1 is a block diagram that illustrates a system in which the invention described herein may be implemented. System 100 includes a cable modem termination system (CMTS) 110. Connected to CMTS 110 is a set of cable modems (CM) 120 through 150. Each cable modem is an example of an embedded device. In FIG. 1, cable modem 120 is embedded in a larger information processing component 115. Component 115 may, for example, be a personal computer or a router. Each of cable modems 130-150 may likewise be embedded in its own respective information processing component (not shown). Each embedded device, e.g., each of cable modems 120-150, can implement stages one through three. Each cable modem can therefore perform analysis, or deep packet inspection, on incoming packets.

A packet that is shown to be suspect after the processing of any of stages one, two, or three, is then sent to central server 160. Central server 160 is an example of a central verification facility, at which a more comprehensive determination can be made as to whether a given packet or packets represent an attempt to subvert system 100, or any component thereof. In the illustration, central server 160 is connected to CMTS 110 via a network 170. In an alternative embodiment, central server 160 may be connected directly to CMTS 110.

As described above, if a packet is determined by central server 160 to represent an attempt to subvert system 100 or any component thereof, central server 160 can so inform the cable modem that initially received the packet. That cable modem can then respond accordingly. One possible response, in an embodiment of the invention, is for the cable modem to notify a central monitoring system 165. As shown in FIG. 1, a cable modem may send such a message to monitoring system 165 via CMTS 110 and network 170. In alternative embodiments, a cable modem may communicate with monitoring system 165 through an alternative route.

Note that system 100 is intended to be one possible topology of a system that embodies the invention. Alternative embodiments are also possible. For example, in an alternative embodiment, central server 160 and central monitoring system 165 may in fact be incorporated in a single component or subsystem. In addition, central server 160 may provide its stage four verification service as a contracted security service. In the context of a cable communications system, the verification service may be provided by a cable service provider.

Figure 2:
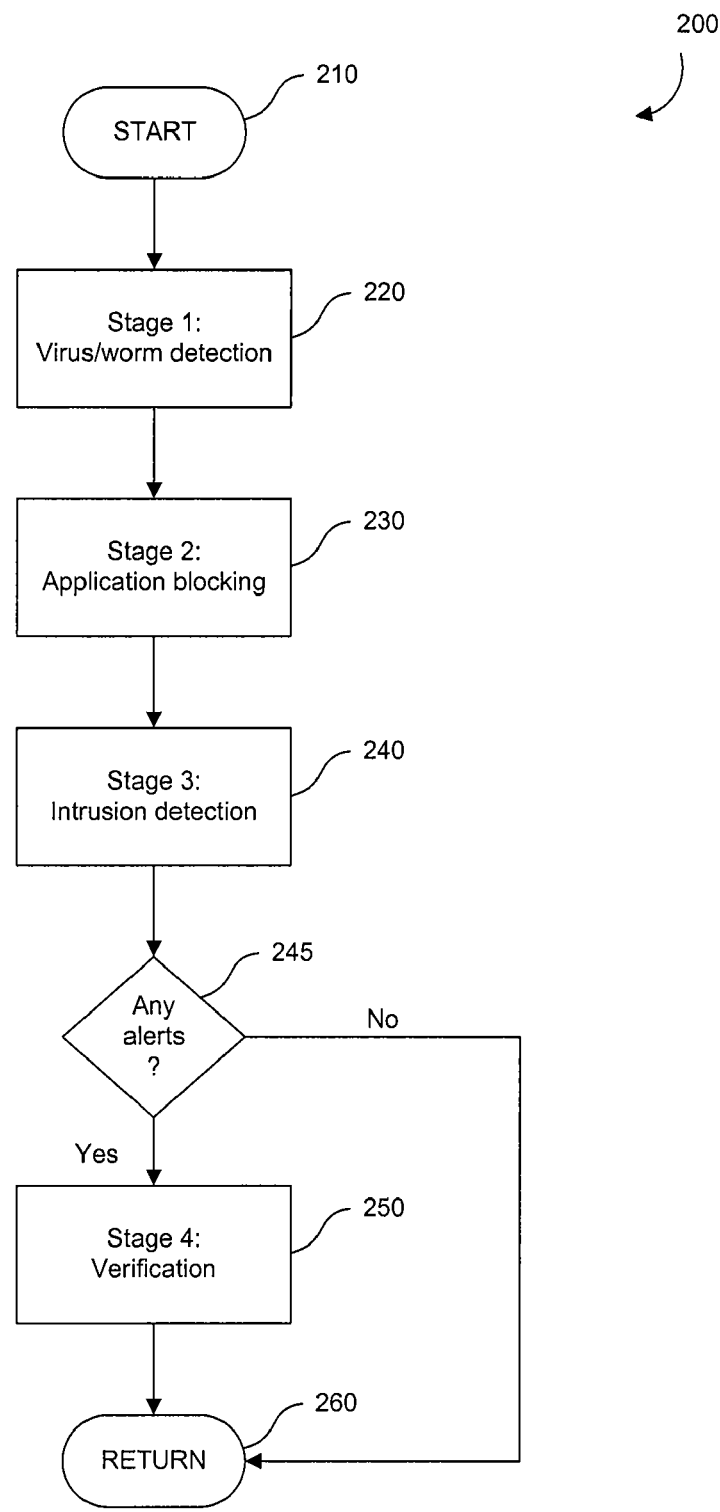
FIG. 2 is a flowchart illustrating the overall processing of an embodiment of the invention.

FIG. 2 illustrates the overall processing of an embodiment of the invention. The process begins at step 210. At step 220, stage one is performed. Here, a first signature of an incoming packet is determined. The first signature is based at least in part on the payload of the packet. The calculated first signature may also be a function of the headers of the packet. The first signature is then compared to signatures of known viruses and worms. The signatures of the known viruses and worms are relatively short in an embodiment of the invention, so that the memory requirements of step 220, i.e., stage one, are relatively low. A match results in an alert state, e.g., the setting of an alert flag.

In step 230, stage two is performed. Here, a second signature of the incoming packet is determined, and compared to signatures of known malicious applications. Again, the signatures of the known applications can be relatively short, so that storage requirements are minimal. A match results in an alert state. In step 240, stage three is performed. Here, a third signature is calculated for an incoming packet and compared to signatures of known intrusion packets. Again, the signatures of the known intrusion packets can be relatively short. As in stages one and two, a match at stage three results in an alert state.

In step 245, a determination is made as to whether any of stages one to three have created alerts. If any of the signatures calculated from the incoming packet matched any of the stored signatures (i.e., if an alert has been raised), then processing continues at step 250. Here, stage four is performed. The packet(s) are sent, in this stage, to a central verification facility. At this facility, more comprehensive testing is performed. It is here that false positives that may have been raised in stages one, two, or three are weeded out. Alternatively, a packet that has caused an alert can be verified at this stage as representing an attack. The process concludes at step 260. If in step 245, it is determined that there have been no alerts raised by stages one through three, then processing proceeds directly to step 260, at which point process 200 concludes.

Figure 3:
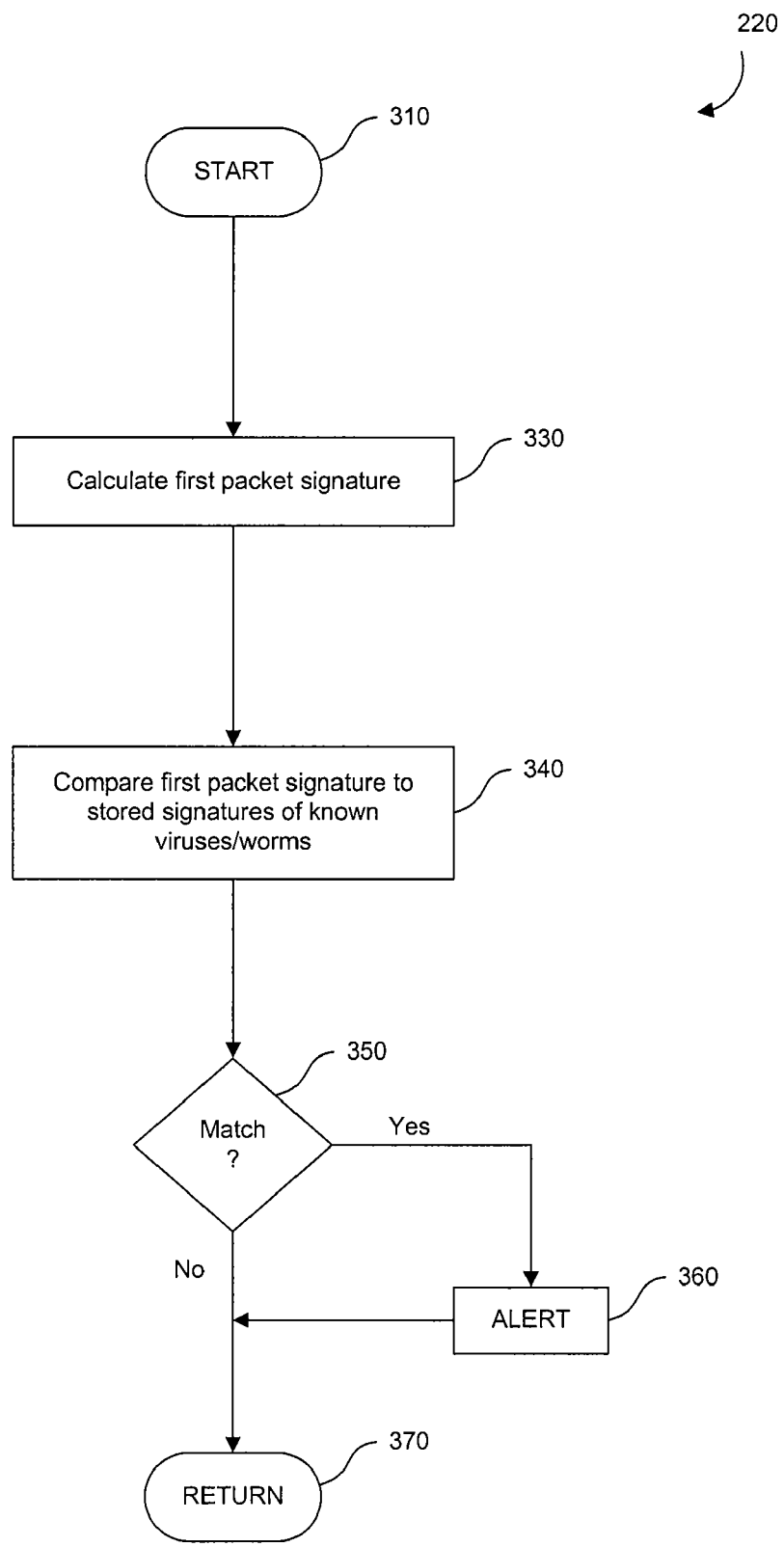
FIG. 3 is a flowchart illustrating virus or worm detection, according to an embodiment of the invention.

Step 220 is illustrated in greater detail in FIG. 3. The process begins at step 310. In step 330, a first packet signature is calculated. The first through third signatures are each a function of the received packet, and in particular, are functions of payload of the packet. The packet signatures may also be a function of the headers of the packet. Any signature represents a characterization of the packet. In an embodiment of the invention, a signature of the packet may be a mathematical function of the binary data that constitutes the packet, such as a hash or a cyclic redundancy code (CRC) of the packet. Moreover, the first through third signatures of a packet may be calculated in the same way, such that the three signatures may be the same. Alternatively, each may be calculated differently.

In step 340, the first packet signature is compared to stored signatures of known viruses or worms. These stored signatures are maintained in memory accessible in or by the embedded device. These stored signatures of known worms or viruses are relatively short, reducing the memory requirement. Because they are relatively short, however, the possibility exists for a false positive alert being raised. This necessitates processing at stage four, which will be described in greater detail below.

In step 350, it is determined whether the first packet signature matches any of the stored signatures. If so, then an alert condition is created, e.g., a flag is raised signifying an alert condition. This alert process is represented by step 360. The process concludes at step 370.

Figure 4:
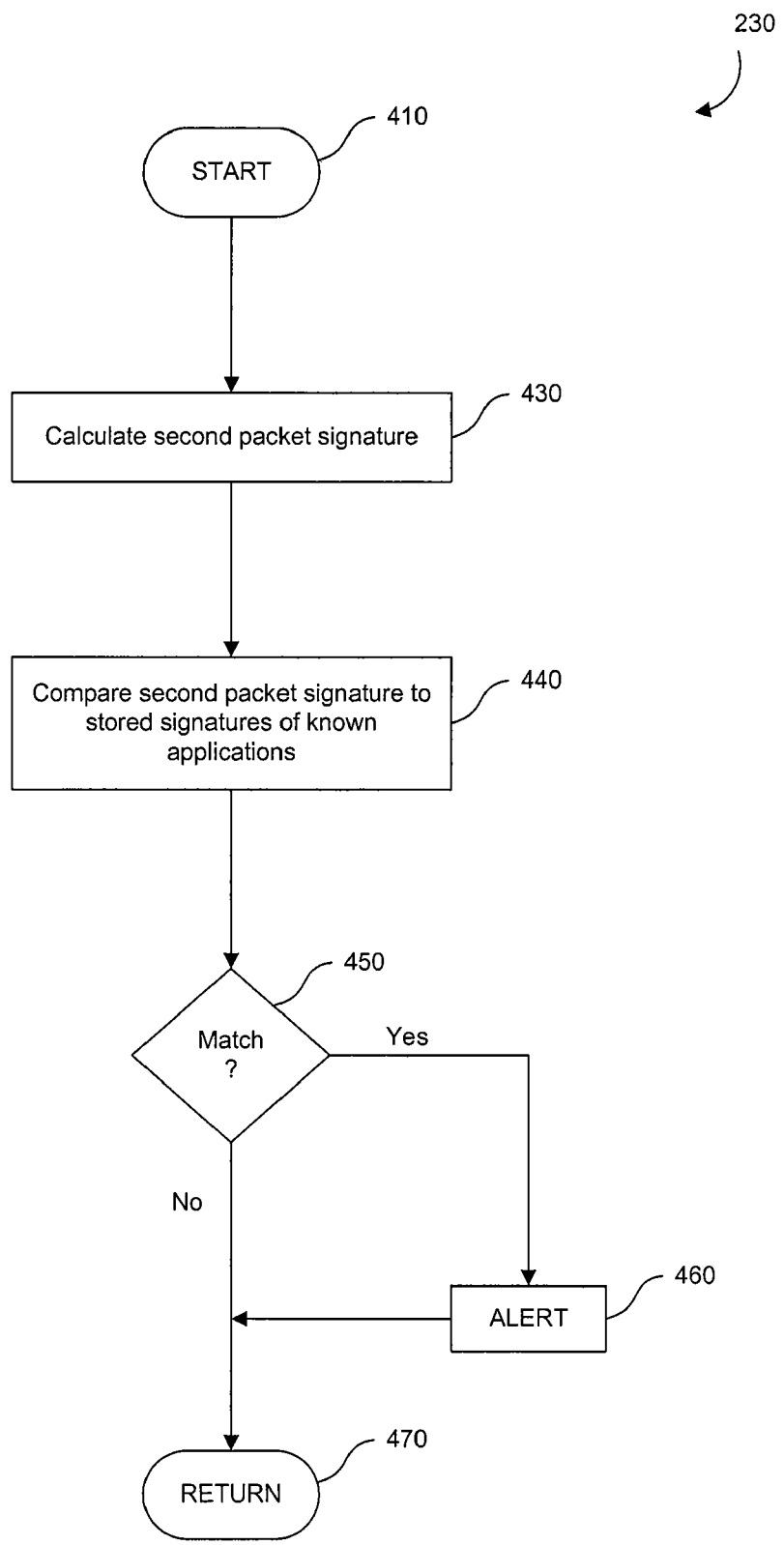
FIG. 4 is a flowchart illustrating application blocking, according to an embodiment of the invention.

FIG. 4 illustrates the processing of step 230 of FIG. 2 (i.e., stage two). The process begins at step 410. At step 430, a second packet signature is calculated on the basis of the incoming packet. As before, this second packet signature is a function of at least the payload of the received packet. In step 440, the second packet signature is compared to stored signatures of known malicious applications. An example of such an application is one that changes the TCP port of the embedded device from port 23 to another port. This represents an insecure state, since telnet traffic coming into port 23 may normally be firewalled; diversion of traffic to a different port could represent an attempt to circumvent the firewall. Again, the stored signatures of the known applications are relatively short, reducing the required memory.

In step 450, a determination is made as to whether the second packet signature matches any of the stored signatures of known applications. If so, an alert condition is raised in step 460. The process then concludes at step 470. As before, given that the stored signatures of known applications are relatively short, the possibility exists for false positives, i.e., the raising of an alert flag in step 460 when the received packet does not in fact represent a known malicious application. Any packet that raises an alert flag in step 460 will subsequently be processed in stage four, as described below.

Figure 5:
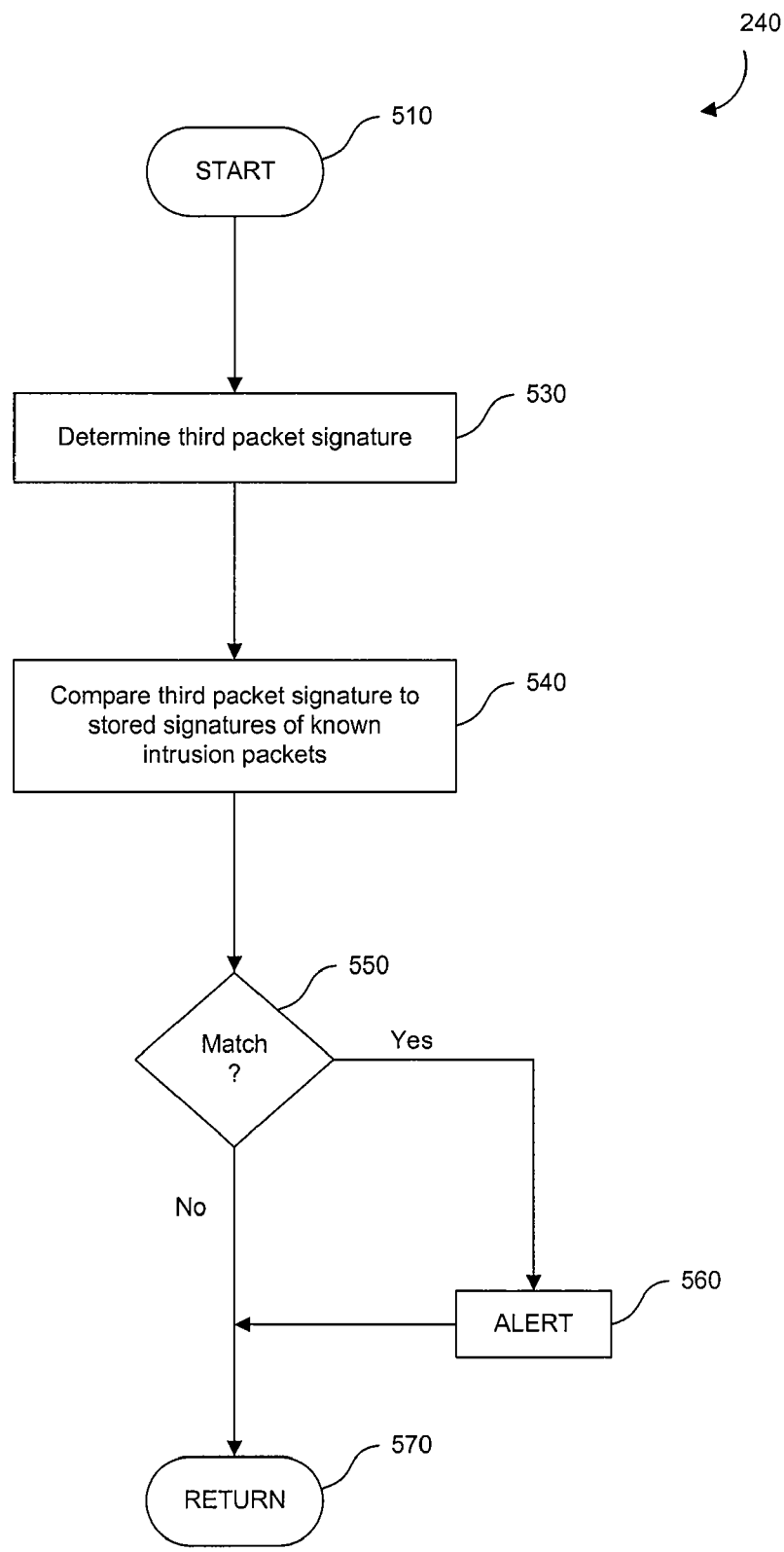
FIG. 5 is a flowchart illustrating intrusion detection, according to an embodiment of the invention.

FIG. 5 illustrates the processing of step 240 of FIG. 2 (i.e., stage three). The process begins at step 510. In step 530, a third packet signature is determined on the basis of the incoming packet. Again, the third packet signature can be a function of the payload and/or the headers of the incoming packet. In step 540, the third packet signature is compared to stored signatures of packets known to represent an intrusion attempt. An example of such a packet is one that is malformed in a manner that is typical of packets generated by hackers seeking to confuse running applications. In step 550, a determination is made as to whether the third packet signature matches any of the stored signatures of known intrusion packets. If there is a match, then an alert condition, e.g., a flag is raised in step 560, and the process concludes at step 570. As before, the stored signatures of the known intrusion packets are relatively short, so that the possibility exists for false positive alerts in step 560. For this reason, more complete verification is performed at stage four.

Figure 6:
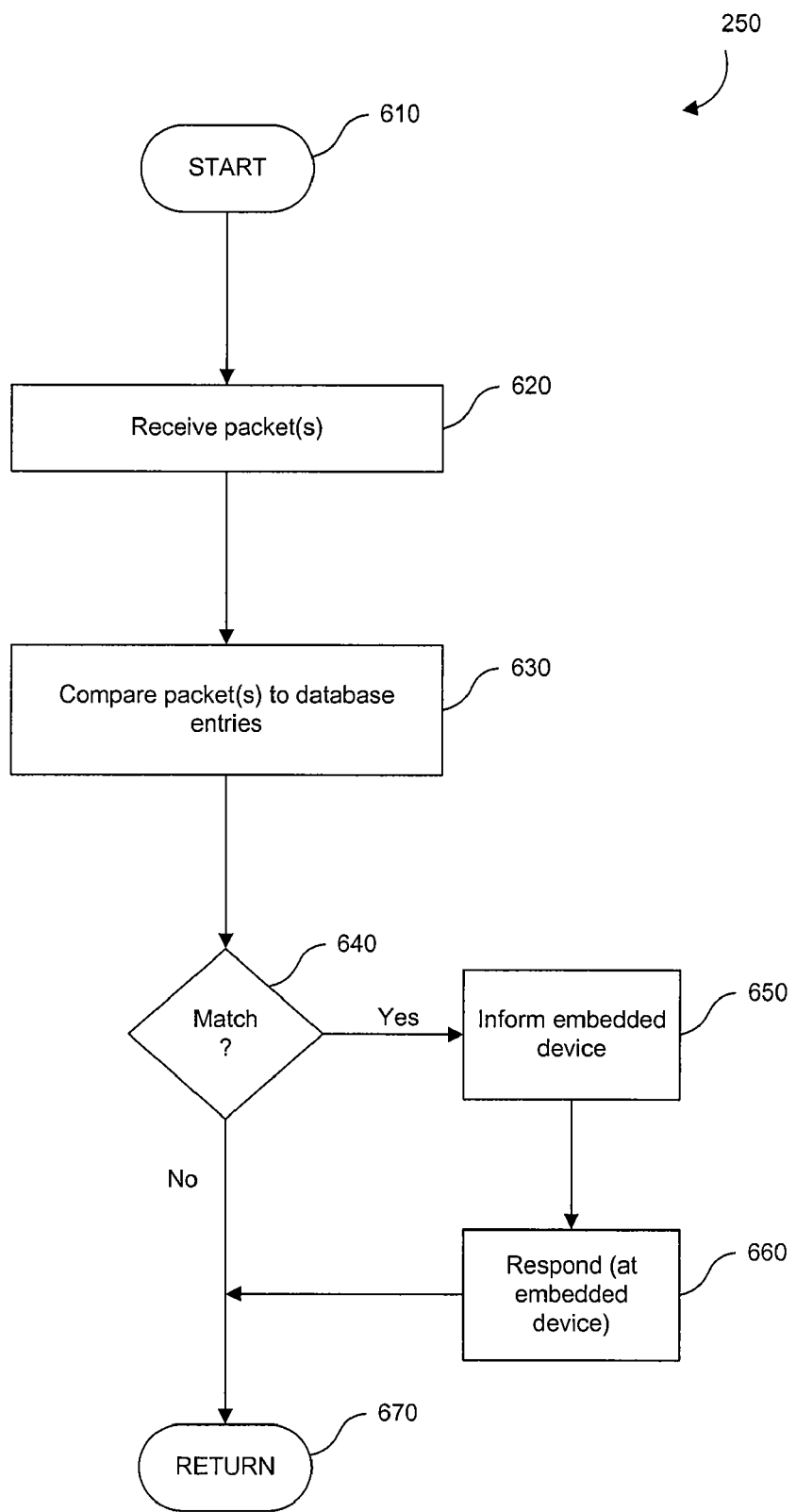
FIG. 6 is a flowchart illustrating the verification of alerts that may have arisen during the processing illustrated in FIGS. 2-5, according to an embodiment of the invention.

Step 250, i.e., stage four, is illustrated in greater detail in FIG. 6. Here, the process begins at step 610. In step 620, a packet for which an alert was raised in at least one of stages one, two, or three is received at a central verification facility, such as a verification server. In step 630, the packet is compared to database entries stored at the verification facility. These database entries represent more complete representations of, for example, worms and viruses. These database entries also include more complete versions of the malicious applications that may have been detected in stage two, and more complete versions of intrusion packets that may have been detected in step three. Because these database entries represent more complete versions of such data, memory requirements at the central verification facility are more substantial than at the embedded components.

If, in step 640, it is determined that the received packet(s) match any of the database entries, then processing moves to step 650. Here, the embedded device at which the suspect packet was initially received is informed by the central verification facility that the packet represents a subversion attempt. In step 660, the embedded device responds in some manner. For example, the source IP address of the received packet may be added to a list of IP source addresses whose packets are to be ignored. In addition, or alternatively, the embedded device may terminate the current stream for security reasons. Alternatively, the embedded device may send an alert to a centralized monitoring system. The process concludes at step 670.

Note that stage four may require more than one packet in order to make a definitive determination as to whether subversion has been attempted. Certain malicious programs may require more than one packet. In this case, two or more packets may be sent to the central verification facility and compared to database entries as appropriate.

Also, in an embodiment of the invention, every packet received by the embedded device is analyzed using the above four-stage process. In an alternative embodiment, only a subset of a packet stream is sent through this process. This reduces the amount of security provided by the process, since some packets may not be analyzed. Performance of the embedded device is improved, however, since not every packet is processed. For example, in an embodiment of the invention, only every $n^{th}$ packet is analyzed. Alternatively, given an incoming stream of packets, only the first packet, a middle packet, and the last packet are analyzed.

Figure 7:
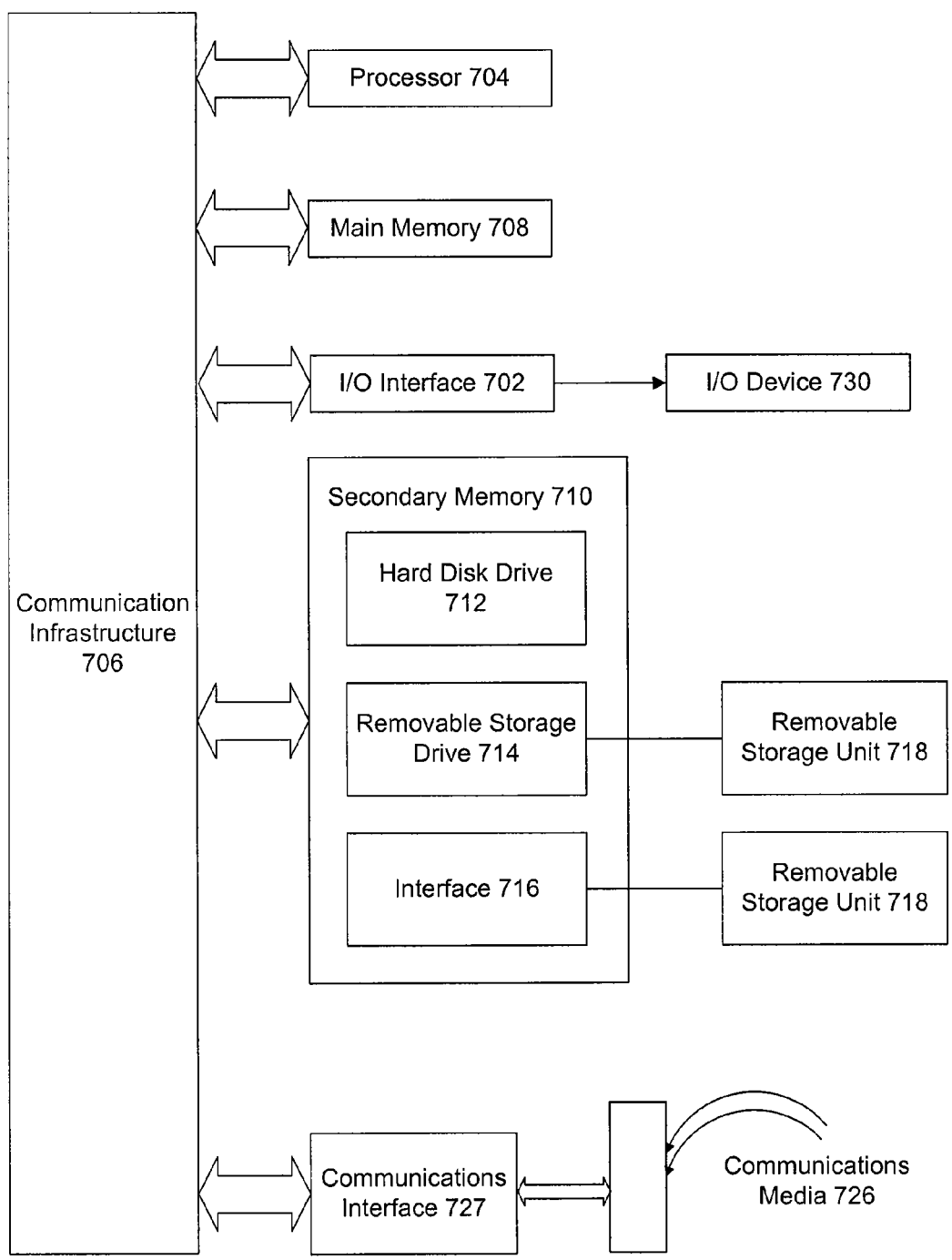
FIG. 7 is a block diagram illustrating the computing context of an embodiment of the invention.

In an embodiment of the present invention, the system and components of the present invention described herein are implemented using one or more computers, such as a computer 700 shown in FIG. 7. The computer 700 can be any commercially available and well known computer capable of performing the functions described herein, or may be a custom design.

The computer system 700 includes one or more processors (also called central processing units, or CPUs), such as a processor 704. The processor 704 is connected to a communication infrastructure 706, such as a bus. The computer 700 also includes a main or primary memory 708, such as random access memory (RAM). The primary memory 708 has stored therein control logic (computer software) and data.

The computer 700 may also include one or more secondary storage devices 710. The secondary storage devices 710 may include, for example, a hard disk drive 712 and/or a removable storage device or drive 714.

The removable storage drive 714 interacts with a removable storage unit 718. The removable storage unit 718 includes a computer useable or readable storage medium having stored therein computer software (control logic) and/or data. Removable storage unit 718 may represent a floppy disk, magnetic tape, compact disk, DVD, optical storage disk, or any other computer data storage device. The removable storage drive 714 reads from and/or writes to the removable storage unit 718 in a well known manner.

The computer 700 further includes a communications or network interface 727. The network interface 727 enables the computer 700 to communicate with remote devices. For example, the network interface 727 allows the computer 700 to communicate over communication networks or media 726 (representing a form of a computer useable or readable medium), such as LANs, WANs, the Internet, etc. The network interface 727 may interface with remote sites or networks via wired or wireless connections. In the embodiment of the invention illustrated in FIG. 1, a computer incorporated in or accessible by a CM would communicate with CMTS 110 over communications media 726.

Control logic, such as that illustrated in FIGS. 3-5, may be transmitted to and from the computer 700 via the communications media 726. More particularly, the computer 700 may receive and transmit carrier waves (electromagnetic signals) modulated with control logic and conveyed via the communications media 726.

Any apparatus or manufacture comprising a computer useable or readable medium having or conveying control logic (software) is referred to herein as a computer program product or program storage device. This includes, but is not limited to, the computer 700, the main memory 708, the hard disk 712, the removable storage unit 718 and the communications media 726 conveying the control logic. Any such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

What is claimed is:

1. A method of inspecting packets to detect an attempt at subverting an information processing computer system, comprising:

(a) determining on the information processing computer system whether a first signature of a received packet matches a signature of a known worm or virus;

(b) determining on the information processing computer system whether a second signature of the received packet matches a signature of a known application;

(c) determining on the information processing computer system whether a third signature of the received packet matches a signature of a known intrusion packet;

(d) if a match is found in any of the above determinations, sending the received packet from the information processing computer system to a central verification facility for further analysis;

(e) receiving, from the central verification facility, an indication that the received packet matches a database entry; and (f) responding to the indication.

2. The method of claim 1, wherein steps (a) through (d) are performed in a device embedded in an information processing component of the information processing computer system.

3. The method of claim 2, wherein said embedded device comprises a cable modem.

4. The method of claim 2, wherein said information processing component comprises a router.

5. The method of claim 1, wherein step (a) comprises:
(i) determining the first signature on the basis of the received packet;
(ii) comparing the first signature to the signature of the known worm or virus; and
(iii) if the first signature is equal to the signature of the known worm or virus, setting an alert flag.

6. The method of claim 1, wherein step (b) comprises:
(i) determining the second signature on the basis of the received packet;
(ii) comparing the second signature to the signature of the known application; and
(iii) if the second signature is equal to the signature of the known application, setting an alert flag.

7. The method of claim 1, wherein step (c) comprises:
(i) determining the third signature on the basis of the received packet;
(ii) comparing the third signature to the signature of the known intrusion packet; and
(iii) if the third signature is equal to the signature of the known intrusion packet, setting an alert flag.

8. The method of claim 1, further comprising:
(g) receiving the received packet at the central verification facility;
(h) comparing the received packet to a database entry; and
(i) if the received packet matches the database entry, outputting an indication of the match.

9. A system for inspecting packets to detect an attempt at subverting an information processing system, comprising:
a device embedded in an information processing component, said embedded device including:
a first processor; and
a first memory in communication with said first processor, said first memory for storing a first plurality of processing instructions for directing said first processor to
determine whether a first signature of a received packet matches a signature of a known worm or virus;
determine whether a second signature of the received packet matches a signature of a known application;
determine whether a third signature of the received packet matches a signature of a known intrusion packet; and
if a match is found in any of the above determinations, sending the received packet to a central verification facility for further analysis;
a central verification facility in communication with said embedded device, said central verification facility including:
a database;
a second processor in connection with said database; and
a second memory in communication with said second processor, said second memory for storing a second plurality of processing instructions for directing said second processor to:
compare the received packet to a database entry; and
if the received packet matches the database entry, output an indication of the match;
wherein said first plurality of processing instructions further directs said first processor to:
receive, from the central verification facility, the indication that the received packet matches the database entry; and
respond to the indication.

10. The system of claim 9, wherein said embedded device comprises a cable modem.

11. The system of claim 9, wherein said information processing component comprises a router.

12. The system of claim 9, wherein said central verification facility comprises:
a server that comprises said second processor; and
a database, accessible by the server, that stores said database entry.

13. A computer program product comprising a computer useable medium having control logic stored therein for causing a computer to detect an attempt at subverting an information processing system, the control logic comprising:
first computer readable program code means for causing the computer to determine if a first signature of a received packet matches a signature of a known worm or virus;
second computer readable program code means for causing the computer to determine if a second signature of the received packet matches a signature of a known application;
third computer readable program code means for causing the computer to determine if a third signature of the received packet matches a signature of a known intrusion packet;
fourth computer readable program code means for causing the computer to send the received packet to a central verification facility for further analysis, if a match is found in any of the above determinations;
fifth computer readable program code means for causing the computer to receive, from the central verification facility, an indication that the received packet matches a database entry; and
sixth computer readable program code means for causing the computer to respond to the indication.

14. The computer program product of claim 13, wherein the computer is in a device embedded in an information processing component.

15. The computer program product of claim 14, wherein said embedded device comprises a cable modem.

16. The computer program product of claim 13, wherein said first computer readable program code means comprises means for causing the computer to:

determine the first signature on a basis of the received packet;

compare the first signature to the signature of the known worm or virus; and if the first signature is equal to the signature of the known worm or virus, set an alert flag.

17. The computer program product of claim 13, wherein said second computer readable program code means comprises means for causing the computer to:

determine the second signature on a basis of the received packet;

compare the second signature to the signature of the known application; and if the second signature is equal to the signature of the known application, set an alert flag.

18. The computer program product of claim 13, wherein said third computer readable program code means comprises means for causing the computer to:

determine the third signature on a basis of the received packet;

compare the third signature to the signature of the known intrusion packet; and if the third signature is equal to the signature of the known intrusion packet, set an alert flag.

19. The computer program product of claim 13, wherein said sixth computer readable program code means comprises means for terminating a data stream that comprises the received packet.

20. The computer program product of claim 13, wherein said sixth computer readable program code means comprises means for causing the computer to add a source interne protocol (IP) address of the received packet to a blacklist.

21. The computer program product of claim 13, wherein said sixth computer readable program code means comprises means for causing the computer to inform a central monitoring system of a subversion attempt.

22. A system for inspecting packets to detect an attempt at subverting an information processing system, comprising:

a device embedded in an information processing component, said embedded device including:

a processor; and a memory in communication with said processor for storing a first plurality of processing instructions for directing said processor to determine whether a first signature of a received packet matches a signature of a known worm or virus;

determine whether a second signature of the received packet matches a signature of a known application;

determine whether a third signature of the received packet matches a signature of a known intrusion packet; and if a match is found in any of the above determinations, sending the received packet to a central verification facility for further analysis;

wherein said plurality of processing instructions further directs said processor to:

receive, from the central verification facility, the indication that the received packet matches the database entry; and respond to the indication.

* * * * *

UNITED STATES PATENT AND TRADEMARK OFFICE
CERTIFICATE OF CORRECTION

| | | |
|---|---|---|
| PATENT NO. | : 7,853,689 B2 | |
| APPLICATION NO. | : 11/871866 | |
| DATED | : December 14, 2010 | |
| INVENTOR(S) | : Russell Enderby | |

It is certified that error appears in the above-identified patent and that said Letters Patent is hereby corrected as shown below:

Claim 20
Column 10, Line 1, "a source interne protocol" should read --a source internet protocol--.

Signed and Sealed this
First Day of March, 2011

David J. Kappos
*Director of the United States Patent and Trademark Office*